United States Patent
Crawford, III et al.

(10) Patent No.: US 11,280,504 B2
(45) Date of Patent: Mar. 22, 2022

(54) LOW AIR LEAKAGE, SECURE CLEAN ROOM WITH REDUCED CONTAMINATION AND SECURE CHEMICAL RESISTANCE

(71) Applicants: James T. Crawford, III, Charlotte, NC (US); Edward W. Waters, Jr., Charlotte, NC (US); Christopher Jacobs, Charlotte, NC (US)

(72) Inventors: James T. Crawford, III, Charlotte, NC (US); Edward W. Waters, Jr., Charlotte, NC (US); Christopher Jacobs, Charlotte, NC (US)

( * ) Notice: Subject to any disclaimer, the term of this patent is extended or adjusted under 35 U.S.C. 154(b) by 0 days.

(21) Appl. No.: 17/324,428

(22) Filed: May 19, 2021

(65) Prior Publication Data

US 2021/0364170 A1    Nov. 25, 2021

Related U.S. Application Data

(60) Provisional application No. 63/027,531, filed on May 20, 2020.

(51) Int. Cl.
| | |
|---|---|
| *F24F 3/167* | (2021.01) |
| *F24F 8/108* | (2021.01) |
| *F24F 13/28* | (2006.01) |
| *F24F 3/00* | (2006.01) |

(52) U.S. Cl.
CPC .............. *F24F 3/167* (2021.01); *F24F 8/108* (2021.01); *F24F 13/28* (2013.01); *B01D 2271/00* (2013.01); *B01D 2271/02* (2013.01); *F24F 2003/008* (2013.01)

(58) Field of Classification Search
USPC ......................................................... 454/187
See application file for complete search history.

(56) References Cited

U.S. PATENT DOCUMENTS

| | | | | |
|---|---|---|---|---|
| 2,869,694 | A * | 1/1959 | Breckheimer | ............ E06B 9/52 |
| | | | | 52/658 |
| 3,098,731 | A * | 7/1963 | Greene | ................... F24F 13/28 |
| | | | | 96/423 |
| 3,781,258 | A * | 12/1973 | Kometani et al. | ......... C08J 3/12 |
| | | | | 528/499 |

(Continued)

FOREIGN PATENT DOCUMENTS

| | | | | |
|---|---|---|---|---|
| CN | 111503806 A | * | 8/2020 | .............. F24F 13/02 |
| GB | 2335975 A | * | 10/1999 | .............. F24F 13/18 |
| KR | 20190139367 A | * | 12/2019 | |

OTHER PUBLICATIONS

Unravelling Polymers; The definitive blog on Polymers by Poly Fluoro Ltd Expanded PTFE 9ePTFE) Tapes—Properties and installation Techniques; Feb. 5, 2016 (Year: 2016).*

*Primary Examiner* — Edelmira Bosques
*Assistant Examiner* — Frances F. Hamilton
(74) *Attorney, Agent, or Firm* — Mark A. Litman & Associates, P.A.

(57) ABSTRACT

A clean room supporting multiple air filter elements within a frame having multiple tracks to support extensions on individual edges of the air filter elements. Within the multiple tracks are a tape of elastic ultralow density polytetrafluoroethylene polymer having a specific density of always less than 1.0, preferably less than 0.8 and most preferred as greater than 0.25 and less than 0.6 positioned along the length of the tracks.

17 Claims, 9 Drawing Sheets

(56) References Cited

U.S. PATENT DOCUMENTS

| | | | | |
|---|---|---|---|---|
| 4,082,525 A * | 4/1978 | Allan | B01D 46/10 | 277/608 |
| 4,233,044 A * | 11/1980 | Allan | B01D 46/0005 | 55/355 |
| 4,439,219 A * | 3/1984 | Lambrecht | B01D 46/0005 | 248/231.21 |
| 4,639,261 A * | 1/1987 | Pittman | B01D 46/10 | 55/502 |
| 4,900,342 A * | 2/1990 | Spengler | B01D 46/10 | 415/119 |
| 4,946,484 A * | 8/1990 | Monson | E04B 9/02 | 454/187 |
| 5,098,625 A * | 3/1992 | Huang | B29C 55/18 | 264/127 |
| 5,395,429 A * | 3/1995 | Sutsko | B01D 46/543 | 95/273 |
| 5,411,438 A * | 5/1995 | White | F24F 13/06 | 137/601.08 |
| 5,536,290 A * | 7/1996 | Stark | B01D 46/2414 | 55/498 |
| 5,871,556 A * | 2/1999 | Jeanseau | E04B 9/02 | 55/385.2 |
| 5,993,311 A * | 11/1999 | Feller | E04B 9/006 | 454/187 |
| 6,267,793 B1 * | 7/2001 | Gomez | E04B 9/02 | 55/385.2 |
| 6,497,739 B2 * | 12/2002 | McGill | F24F 3/167 | 55/385.2 |
| 6,858,055 B2 * | 2/2005 | McGill | B01D 46/0005 | 55/385.2 |
| 6,918,940 B1 * | 7/2005 | Lackey | B01D 46/0005 | 55/385.1 |
| 7,323,028 B2 * | 1/2008 | Simmons | B01D 46/0005 | 55/351 |
| 8,048,186 B2 * | 11/2011 | Mann | F02C 7/052 | 55/483 |
| 8,066,843 B2 * | 11/2011 | Ragsdale | F16J 15/122 | 156/308.2 |
| 8,105,409 B2 * | 1/2012 | Mann | B01D 46/002 | 55/483 |
| 8,784,528 B2 * | 7/2014 | Gorman | B01D 46/002 | 55/509 |
| 9,039,801 B2 * | 5/2015 | Gorman | B01D 46/10 | 55/495 |
| 9,557,073 B2 * | 1/2017 | Breed | F24F 13/20 | |
| 9,784,287 B2 * | 10/2017 | Whittemore | F04D 29/646 | |
| 10,393,074 B2 * | 8/2019 | Schmid | F02M 35/02491 | |
| 10,939,975 B2 * | 3/2021 | Spencer | A61L 2/20 | |
| 2005/0247105 A1 * | 11/2005 | Dikken | B01D 69/10 | 73/28.04 |
| 2006/0150596 A1 * | 7/2006 | Takahashi | C09K 3/10 | 55/502 |
| 2010/0105309 A1 * | 4/2010 | Ishibashi | C12M 37/00 | 454/187 |
| 2014/0367023 A1 * | 12/2014 | Hisano | B29C 48/0018 | 156/78 |
| 2017/0276400 A1 * | 9/2017 | Hugues | F24F 13/085 | |
| 2017/0304758 A1 * | 10/2017 | Dinakaran | B01D 46/10 | |
| 2019/0030382 A1 * | 1/2019 | Roussos | A62C 4/04 | |
| 2021/0252194 A1 * | 8/2021 | Balaji | A61L 27/16 | |

* cited by examiner

**Figure 6A
Volatile Organic Compounds (VOC) by ATD GC-MS
Replacement page**

LOW AIR LEAKAGE, SECURE CLEAN ROOM WITH REDUCED CONTAMINATION AND SECURE CHEMICAL RESISTANCE

RELATED APPLICATIONS DATA

This application claims priority from U.S. Provisional Patent Application Ser. No. 63/027,531, filed 20 May 2020.

BACKGROUND OF THE INVENTION

1. Field of the Invention

The present invention relates to the field of clean rooms, including electronic, pharmaceutical, chemical and medical clean rooms, medical clean rooms, permanent structures, temporary structures and modular cleans having filters built therein, and more particularly for compositions and materials improving the function, assembly, dismantling and reuse of the clean room structures.

2. Background of the Art

Clean rooms are highly sanitary rooms wherein manufacturing (especially electronic, chemical and pharmaceutical manufacturing) and medical treatments can be performed where high degrees of sterility are required and highly limited transmission of air carrying microbes into and possibly out of the clean room. Oftentimes, these clean rooms are used in emergency situations, as with the dramatic onset of the highly contagious COVID-19 virus. Clean rooms must be set up quickly, then the filters replaced as often as necessary (and even cleaned and replaced), and then disassembled to be moved to another location. The majority of cleanrooms in the world are large, fixed in place facilities used for the manufacturing of pharmaceuticals and or computer chips and many other types of manufactured parts, each at different levels of cleanliness. Although this product could be used in a modular room, the majority of the present invention systems, methods and materials would not be so used. Also, the room where the medical treatments are performed would usually be called operating theaters. The present inventive technology would work well there as well.

The more mobile clean rooms are somewhat modular, with frames with special structure to them allowing for different elements, especially the HEPA filters, to be secured and positioned with relatively air-tight seals between the filters and the fame to restrict any air seepage at the junctures. Because it can be disinfected many times with strong chemicals that would degrade the products presently used in clean rooms.

There are generally two methods used to install filters in a cleanroom grid system. Installations from the plenum interstitial side of the grid are referred to as "top load". Filters installed from the clean space side are termed "bottom load". The introduction of LDS (load distributing system or load drop system) gives either system a distinct advantage over current sealing methods, but they have different installation requirements. When applicable, a system of shims/guides may be employed to center the filter/knife edge on the LDS on all installation types.

One example of prior art efforts to create a portable clean-room is evidenced by Published US Patent Document No. 20170304758 (Dinakaran et al.).

Top Load Filter Installation

When a top load filter is installed from the plenum side of the grid, gravity exerts a force on the knife edge to penetrate the LDS. This may not be sufficient to form a seal, even with quality LDS materials, so an additional external force must be applied to form a sustainable seal. The filter must be centered on the UltraLDS™ low density PTFE sealant, and a tensioning kit is then installed on each end of the filter, usually across the longitudinal axis. The tensioning kit consists of springs on each side of the filter body, connected by a cable. The other end of the spring is attached to the grid system by a specifically designed anchor.

The installation of the tension kit is as follows, for a typical 2×4 HEPA/ULPA setup. The four spring anchors are attached to the filter grid, approximately 10 inches (25.4 cm) from the end of the filter. Opposing springs are attached to the anchors and tension applied by a custom spring tensioning device. When the springs are extended, a cable is installed between them, and the tension is released. The spring tension is transferred to the filter body via the cable, and a seal is established. Springs will also be useful to cancel or nullify any vibration or movement in the filters possibly causing the seal to be broken.

Components of the Tensioning System Kit.

(A) Grid Anchoring Hardware or "Saddle" for the Springs

One variable in the installation of the tension kit is selection of the method of attaching the springs to the filter grid. Because of the wide variety of cleanroom filter grids, each anchoring method may have to be custom designed.

The anchor must meet the following criteria (1) Must be made of cleanroom compatible materials;
(2) Attaching the anchor to the grid should be a simple and quick, using a minimum of tools;
(3) The anchor must be able to withstand the spring tension for the life of the installation; and
(4) The anchor must be constructed so that the spring can be easily attached to the anchor once installed.

(B) Springs

There are generally four springs in the kit, placed on each side of the filter body. (See FIG. 2)

The springs should meet the following criteria, which may vary somewhat based on the dimensions of the specific filter systems and clean rooms:

(1) Must be made of stainless steel, or other cleanroom class compatible material, especially a metal of rigid polymer or reinforced polymer).
(2) Should have hooks (or other latching connecting devices, such as an open-close coil loop) on at least one and even each end or at least one end that have the following criteria:
   (a) Constructed in such a manner that allows rapid installation of one end of the spring to the grid anchor.
   (b) The opposite end of the spring must be able to accommodate the tensioning device hook (or compatible connector), and a cable end loop. When tension is released from the spring, the tensioning hook must be simple to remove.
(3) The two springs on each cable (and therefore at least 4 springs per filter, with two cables/filter) working in tandem under tension must provide enough downward force to maintain a sustainable seal. The springs must be capable of maintaining sufficient tension over the life of the installation and not be readily elastically deformable.
(4) The length of the spring and its potential tension can be determined by the factory on a per installation basis.
(5) There are grid systems that do not employ a knife edge (an extending ledge, lip or ridge) to form a seal. These systems use two flat surfaces, with the LDS placed in between them. The springs must develop enough force to form and then maintain a seal, often assisted by gravity.

(C) Cables

There is usually at least one cable in a tension kit, that is used to connect the two springs in an opposed set of springs, and apply force to the filter body. The cable should meet the following criteria:

(1) Must be made of cleanroom compatible materials as mentioned above for the springs;
(2) Must be at least 1/16 to 5/16$^{th}$ inches in diameter, preferably between 2/16 to 4/16 inches in diameter;
(3) The end of each cable must be formed into a loop, not to exceed 5/16$^{th}$ inches in diameter. The loop may be formed by mechanical clamping or locking;
(4) The total length of the cable under full tension tends to be a function of filter height/width, and spring length.
(5) The cable must be constructed in such a fashion that its design length is maintained over the life of the installation (again referencing resistance to elastic fatigue, permanent stretching, caused by weakening of the material forming the cable).

(D) Spring Tensioning Device

The use of a spring tensioning device is highly desirable if not required due to the unique operating environment. Very tight spaces require a unique tool (apparatus) that will be placed in between two filters that are only 1-inch apart. The apparatus is made to have two opposing arms that will fit into or on the ¼-inch 20 threaded track. This will allow the ratcheting mechanism to be positioned over the tensioning spring and then lowered having a hook type end, attach to the spring assembly which is attached to the filter grid via the Saddle and then be ratcheted to apply as much as 125 lbs of load with very little effort.

Bottom Load Filters

As the name implies, these filters are installed from the clean side of the grid (with the bottom of the filter facing, inward or outward from the room and how with respect to air flow through the filter). This device of the invention is designed to fit into the threaded groove where the saddle (grid anchoring hardware) is anchored to stabilize the device and system of the present invention and is made so that it can pull a load on the springs in a confined space of about 0.75 to 1.15 inches between two filters (with some larger variation allowed with different room or facility designs). Additionally, the ratcheting portion of the device needs to be able to pull a load of up to or greater than 100 pounds with no other leverage and only using the strength of a human hand. The ratcheting components must be constructed of materials allowing it to be used in a clean room. As in the Top Load filter, the gel/gasket track is replaced with LDS. This tends to work on top load filters bottom load filters are installed differently. On a bottom load filter the cable assembly would be attached to a spring that would then be treaded through a bolt and tightened to create the load necessary to seal the filter using LDS In a typical design, a threaded stud is welded near each corner of the plenum opening. The filter is held in place by a metal tab placed over the stud, and bolted down. LDS requires a relatively constant pressure (preferably evenly distributed along the length of contact) in order to form a sustainable seal. The stock factory tab is to be replaced by a specially designed bracket that is application specific. The bracket fits over the existing stud, and has room for a spring to be placed on the stud, and a nut applied. As the nut is turned, the spring is compressed, forcing the bracket upward. This applies upward force to the filter, to form a seal.

The bracket is custom designed for each installation, and must be capable of maintaining compression for the life of the installation. Springs are specified on a basis of the individual designs. All components of the system must be composed of cleanroom compatible materials. After compression is applied, there will be sufficient thread remaining on the stud to install a protective cover if needed.

Because of significant reported failures in the seals between joining elements, which have been primarily identified as failures of sealants recommended and used in joining structural framed elements to the filter elements, significant improvements in compositions used to seal junctions have been necessitated.

Teflon™ fluorinated tapes have been widely used in many fields for decades.

U.S. Pat. No. 4,368,676 (Henrickson) evidences a process and apparatus are described for collection of gases and particulates which arise during the feeding of an electric furnace, especially in the manufacture of phosphorus. The collection system for the gases and particulates includes novel explosion panels which are employed in an enclosure that contains the gases and particulates, and the use of such panels also in the ductwork and filter units that conveys and treats the gases and particulates from the enclosure. Teflon™ tapes are disclosed as closure materials.

U.S. Pat. No. 4,568,401 (Davis) discloses a method of making an electrical cable in which an inner electrical conductor is loosely carried within the interior of an outer sheath. The inner conductor has a length in excess of the length of the sheath such that the cable is better able to withstand stretching and bending without damage to the inner electrical conductor.

U.S. Pat. No. 4,586,602 (Levey) evidences a detonating cord transport package wherein detonating cord is installed on a plurality of separator-support members so as to provide crossover locations at frequent intervals at which crossover locations there is incorporated means for stopping any detonation that occurs, with the result that such detonation will be confined to a relatively short length of detonating cord and will also be confined to the container in which the detonating cord transport package is disposed. Teflon™ tape is used as wrapping.

Published US Patent Application Document No. 20170304758 (Dinakaran et al.) evidences filtration systems, filters, and corresponding methods of installing and using a clean room filter. A filtration system may include a housing defining a vent opening and a filter opening. The housing may include a knife edge disposed about a perimeter of the filter opening and configured to extend downwardly. The filtration system may include a filter removably attached to the housing. The filter may include a frame having an opening and a channel disposed about a perimeter of the opening. The filter may further include a filter substrate disposed in the opening of the frame, a gasket disposed about a perimeter of the opening within the channel, and an adhesive compound disposed within the channel between the gasket and the channel. The filter may be configured to engage the knife edge of the housing, such that air may be configured to pass between the clean room and a duct via the filter. Teflon™ tape gaskets are used.

SUMMARY OF THE INVENTION

A clean room and method of constructing a clean room supporting multiple air filter elements (especially HEPA/

ULPA filters) within a frame having multiple tracks to support extensions on individual edges of the air filter elements (especially HEPA, high efficiency particle air filters) Within the multiple tracks are an extruded or molded strip of tape or bead or molding strip of elastic ultralow density polytetrafluoroethylene polymer having a specific density of greater than 0.10, greater than 0.20 or greater or equal to than 0.25 and less than 0.6 positioned along the length of the tracks.

The method includes providing a clean room by starting with a frame that supports at least two adjacent filter elements having two pairs of opposed sides, one pair along its length and a second pair along its width;
the frame having pairs of filter element separating support arms aligned to support adjacent filter elements;
the pairs of filter element separating support arms separated by orthogonal bracing arms;
each filter element separating support arm to be spaced between two adjacent filter elements having two parallel tracks separated by a raised panel extending the length of the two parallel tracks, and two parallel outside support arms having at least one track with raised sides;
each orthogonal bracing arm having at least one track with raised sides along a length of each at least one track.
the filter elements having four extending linear edges along a bottom of each of the opposed sides of the filter elements with a width less than a width of a parallel track;
placing a tape of elastic ultralow density polytetrafluoroethylene polymer having a specific density of greater than 0.10, equal to or greater than 0.25 and less than 0.6 along the length of two tracks in at least one opposed filter element separating support arm, along the at least one track in the two outside support arms and along the length of the at least one track in each bracing arm;
inserting the four extending linear edges into each of the length of the two opposed filter element separating support arms and along the length of the at least one track in each bracing arm;
the four extending linear edges compressing and conforming the tape to form an effectively air tight seal along every track; and
placing an elastically restraining cable on a face of each of the filter elements opposite to the four extending linear edges.

DETAILED DESCRIPTION OF THE INVENTION

The present invention includes both a clean room and a method of constructing a clean room. All descriptions and variations used in describing the method are applicable to the clean room itself, and visa versa.

A first embodiment within the scope of the present invention is using a system and a method for applying multiple filter elements into an air flow surface of a medically safe room and limiting air flow around sides of the filter elements including:
providing a frame that supports at least two adjacent filter elements having two pairs of opposed sides, one pair of opposed sides along its length and a second pair of opposed sides along its width;
the frame having at least one filter element separating support arms aligned to support adjacent filter elements;
the at least one filter element separating support arm separated by an orthogonal bracing arm;
the frame is formed with each filter element separating support arm being spaced between two adjacent filter elements, each filter element separating support having two parallel tracks separated by a raised panel extending the length of the two parallel tracks, and two parallel outside support arms are positioned at outer edges of the multiple filter elements, the two parallel outside support arms having at least one track with raised sides forming the at least one track;
each orthogonal bracing arm having at least one track with raised sides along a length of each at least one track.
the filter elements having four linear edges extending coplanar from sides of the filter elements along a bottom of each of the opposed sides of the filter elements with a width less than a width of a parallel track;
placing a tape of elastic ultralow density polytetrafluoroethylene polymer having a specific density of greater than 0.10, greater than 0.20 or equal to or greater than 0.25 and less than 0.6 along the length of the two parallel tracks in at least one opposed filter element separating support arm;
placing a tape of elastic ultralow density polytetrafluoroethylene polymer having a specific density of greater than 0.10, greater than 0.20 or equal to or greater than 0.25 and less than 0.6 along the length of the two parallel tracks in at least one opposed filter element separating support arm;
placing sealant that is limited or not (as herein defined) off gassing along the at least one track in the two outside support arms and along the length of the at least one track in each bracing arm;
inserting the four extending linear edges into each of the length of the two opposed filter element separating support arms and along the length of the at least one track in each bracing arm;
the four extending linear edges compressing and conforming the tape in the two parallel tracks in at least one opposed filter element separating support arm to form an effectively air tight seal along every track; and placing an elastically restraining cable on a face of each of the filter elements opposite to the four extending linear edges.

In the above method and system, the ultralow density polytetrafluoroethylene tape (often described hereinafter as the "ULDP tape") is used only on the most critical support arms between adjacent filter elements that have two tracks. It is also desired that the ULDP tape be applied on the two parallel outside support arms, as described herein. Additionally, it is more preferred when the ULDP tape is used in every track used to support individual and collective arrays of filter elements, including the tracks in the support arms between adjacent filter elements, the two parallel outside support arms and the orthogonal bracing arms. These ULDP tapes are also "non-gassing" tapes in that there is essentially little (less than 0.1% by weight, or even less than 0.05% by weight) to no low molecular weight materials (including solvents) that will emit from the polymer. Additionally, the invention is to replace existing technologies using a gel type product that cannot be cleaned, even with strong cleaning agents to kill a host of microbes, including bacteria, fungi, viruses and especially COVID-19, and other bad actors as well. In a pharmaceutical application, it is needed to wipe down all surfaces constantly and thoroughly. And the uniformly commercially used gels don't lend themselves chemically to that type of aggressive cleaning. Also, the present inventive technology comes out of a fully-ready container, such as bag, box, carton, package or the like, and is ready to install. On the other hand, gel has to be poured into the track and then there can be a set-up time for the gel, and the workers have to wait a day or more for it to cure before a filter can be placed into the track. Once the present technology ultralow density PTFE tape or ULDP molding strip is placed into the track, it can be used immediately for filter installation and use. The fact that there is no off-gassing from the ultralow density PTFE molding or tape further accelerates the ability to use the facilities and reduce deleterious, toxic or annoying odor in the work environment. Because of this ease of use, the downtime in critical facilities is very minimal. To replace gel, it is necessary to close down that part of the plant or facility that needs the filter (and contemporarily) and the gel replaced, then workers have to remove all the gel (which may then be a hazardous waste). This takes many days depending on the number of filters. For example: 12 gel tracks filled with gel would take one week to scrape and prep the track then pour the gel and then still wait at least 24 hours for it to cure. The same process with the present technology using ULDP tape or molding would be 5-6 hours total.

A method is described for applying filter elements into an air flow surface of a medically safe room (other clean rooms may also benefit from this method and structure). The safe room or clean room limits air flow around sides of the filter elements, preventing ingress or egress of contaminated air from the room. The method provides a frame that supports at least two (this includes three, four or more filter elements) adjacent filter elements. The filter elements are usually in rectangular structures, with a main surface, an opposed surface, two opposed long sides and two opposed shorter sides. The filter element having two pairs of opposed sides (the long and shorter sides), one pair of sides along the length of the filter element and a second pair of sides along the width of the filter element. The frame having pairs of filter element separating support arms that are aligned to support adjacent filter elements. Support arms between adjacent filter elements will have two tracks, one each to engage with extensions off the filter elements that are inserted into the tracks, as later explained in greater detail. There are pairs of the support arms between adjacent filter elements will have two tracks pairs when there are at least three filter elements. When there are only two filter elements, there would be on a single filter element separating support arm. The filter element separating support arms are separated and structurally supported by orthogonal bracing arms.

Each filter element separating support arm is spaced between two adjacent filter elements having two parallel tracks separated by a raised panel extending the length of the two parallel tracks. The two parallel outside support arms (adjacent a long side of the filter elements at the ends of an array of multiple filter elements) have at least one track with raised sides. Each orthogonal bracing arm has at least one track with raised sides along a length of each at least one track. Only one track is essential (a second is redundant) as these bracing arms may be supporting only a single filter element, while adjacent sides of the filter element separating support arm will support two adjacent filter elements.

The filter elements have four extending linear edges (these may be referred to as knife edges, edge extensions, extending arms or the like) along a bottom of each of the opposed sides of the filter elements with a width less than a width of a parallel track. As the filter elements are preferably rectangular, the four extending linear edges will also match the geometric shape of the filter element, and in the preferred case, also form a rectangle.

The method includes placing a tape of elastic ultralow density polytetrafluoroethylene polymer having a specific density of greater than 0.10, greater than 0.20 or equal to or greater than 0.25 and less than 0.6 along the length of two tracks in at least one opposed filter element separating support arm, along the at least one track in the two outside support arms and along the length of the at least one track in each bracing arm. The four extending linear edges are inserted into each of the length of the two opposed filter element separating support arms and along the length of the at least one track in each bracing arm.

The four extending linear edges compress and conform the tape to form an effectively air tight seal along every track; and The method fundamentally may conclude by placing an elastically restraining cable on a face of each of the filter elements opposite to the four extending linear edges.

The method may particularly use the elastic ultralow density polytetrafluoroethylene polymer has a specific density of greater than 0.10, greater or equal to 0.20, or greater than 0.30 and less than 0.55. The method includes installing the system that allows for applying and tightening restraining cables that are attached at opposite ends to tension springs secured in turn to a stable support element of the frame.

The tape is relatively thick for what is considered a tape, and is at least ⅜ inch up to 1.25 inches in thickness and width, with ¾-inch by ¾-inch being typical.

The method is preferably also practiced wherein a previous set of filter elements is first removed from the frame by lifting used filters off the frame, physically peeling exhausted elastic ultralow density polytetrafluoroethylene polymer out of all tracks, replacing exhausted tape with virgin elastic ultralow density polytetrafluoroethylene polymer tape, and then applying unused filters onto the frame and placing an elastically restraining cable on a face of each of the filter elements opposite to the four extending linear edges. An important aspect of the invention is the coherence of the described ultralow density PTFE tapes, which form the necessary air seal at contact points between the filter elements and the frame, is that the used tape on used filters can be physically stripped (even just peeled) off the tracks in the frame. The tape therefore appears to only lightly adhere to track surfaces, but rather merely conforms to the filter element extensions and the tracks to form an air seal, without adhering contact points so strongly that significant residue would remain on the surfaces of the track.

The method for replacing tarnished or exhausted filters is performed wherein a previous set of filter elements is first removed from the frame by lifting used filters off the frame, physically peeling exhausted elastic ultralow density polytetrafluoroethylene polymer out of all tracks, replacing exhausted tape with virgin elastic ultralow density polytetrafluoroethylene polymer tape, and then applying unused filters onto the frame and placing an elastically restraining cable on a face of each of the filter elements opposite to the four extending linear edges.

A clean room with a replaceable filter element system includes:
a frame that supports at least two adjacent filter elements having two pairs of opposed sides one pair along its length and a second pair along its width;
the frame having pairs of filter element separating support arms aligned to support adjacent filter elements;
the pairs of filter element separating support arms separated by orthogonal bracing arms;
each filter element separating support arm spaced between two adjacent filter elements having two parallel tracks separated by a raised panel extending the length of the two parallel tracks, and two parallel outside support arms having at least one track with raised sides;
each orthogonal bracing arm having at least one track with raised sides along a length of each at least one track.
the filter elements having four extending linear edges along a bottom of each of the opposed sides of the filter elements with a width less than a width of a parallel track;
a tape of elastic ultralow density polytetrafluoroethylene polymer having a specific density of greater than 0.10, greater than 0.20 or greater than 0.25 and less than 0.6 positioned along the length of the two tracks in at least one opposed filter element separating support arm, along the at least one track in the two outside support arms and along the length of the at least one track in each bracing arm;
the four extending linear edges inserted into each of the length of the two opposed filter element separating support arms and along the length of the at least one track in each bracing arm;
the four extending linear edges having compressed and conformed the tape within the length of the two tracks in at least one opposed filter element separating support arm, along the at least one track in the two outside support arms and along the length of the at least one track in each bracing arm to form an effectively air tight seal along every track; and
an elastically restraining cable on a face of each of the filter elements opposite to the four extending linear edges.

A review of the Figures will assist in a further understanding and appreciation of the details of the present invention.

Figure 1:
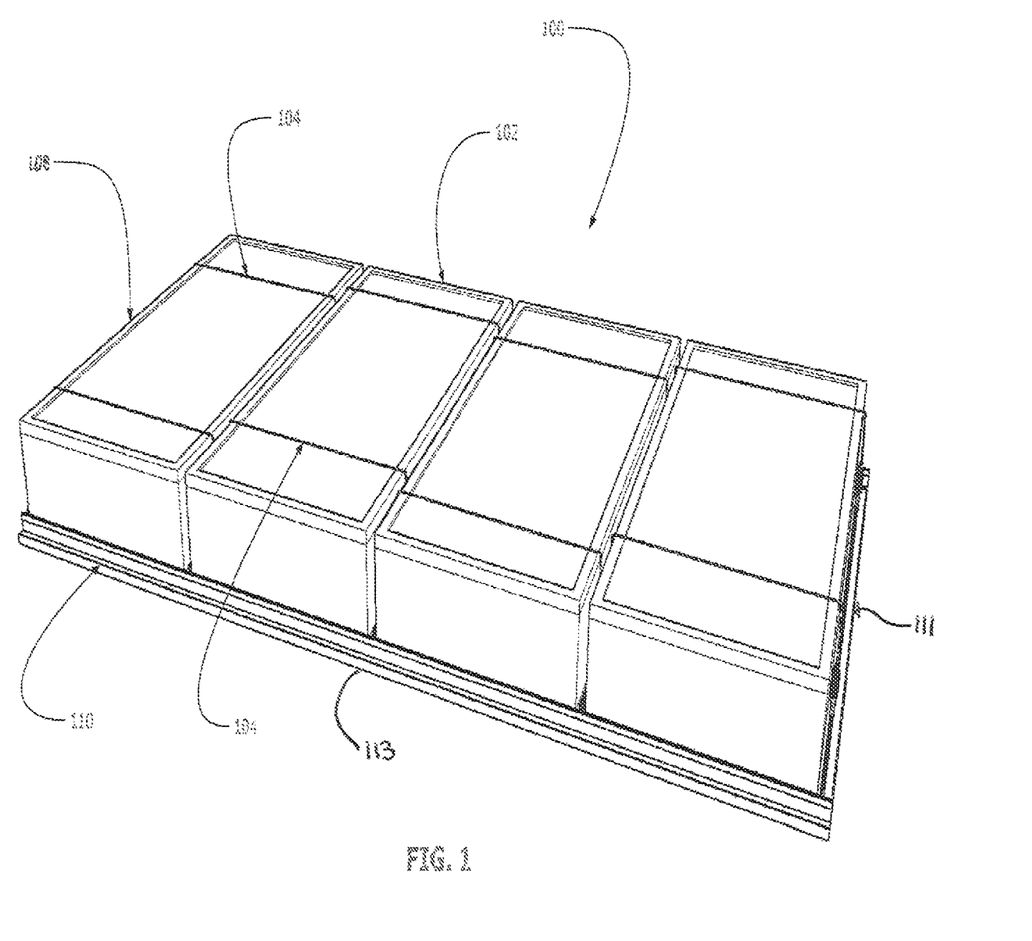
FIG. 1 is a perspective view of ceiling filter elements secured to a frame for use as part of a clean room.

FIG. 1 is a perspective view 100 of ceiling filter elements 112 secured to an outside support arm 113 of a frame 110 and an orthogonal bracing arm 111 of the frame 110 for use as part (in this case a ceiling or roof) of a clean room (not shown). About each filter element 112 is shown what is referred to as the long side 108 and the short side 102. Cables 104 used to maintain contact pressure between the filters 112 and the frame 110 are shown spaced apart on each filter element 112.

Figure 2:
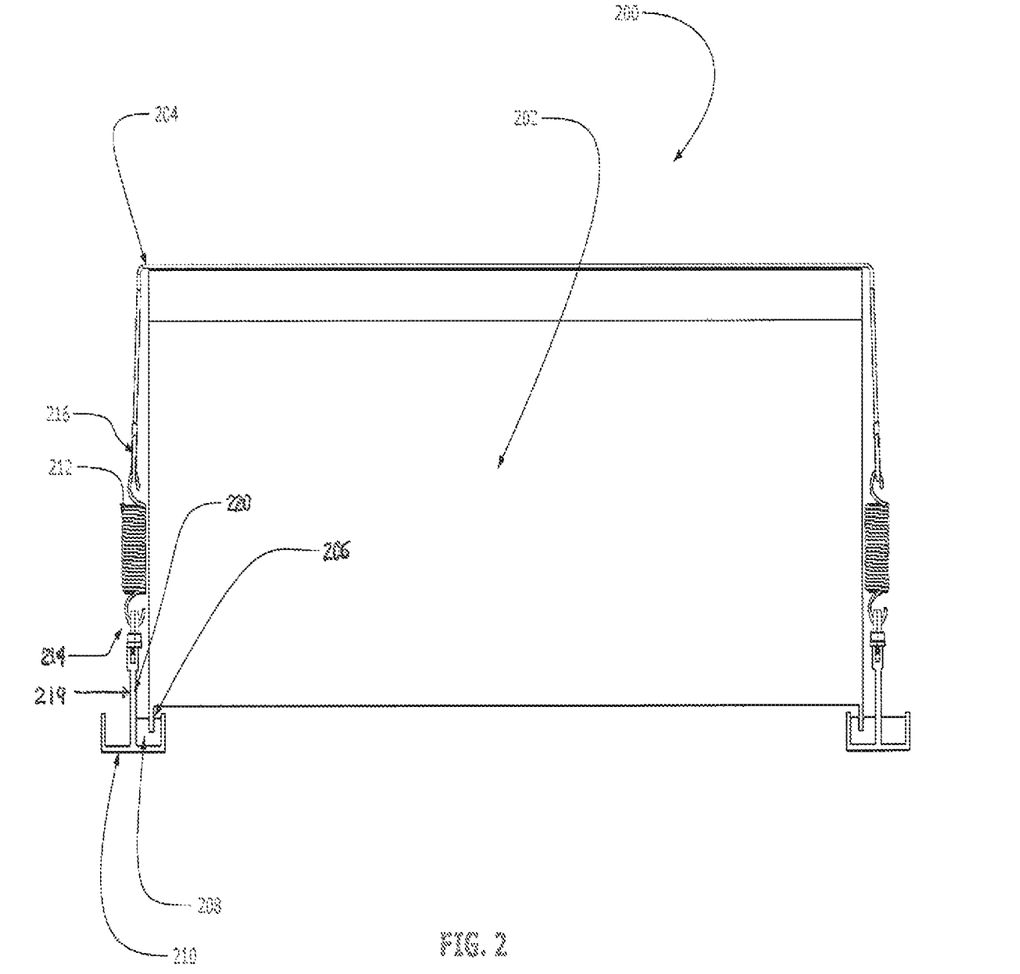
FIG. 2 is a side view of a filter element secured by a spring tensioned cable to each filter element separating support.

FIG. 2 is a side view 200 of a filter element 202 secured by a spring 212 tensioned cable 204 to each filter element separating support 210. The cables 204 are connected to the tensioning spring 212 through a physical connector such as a hook and loop 216 (or hook and eye, hook and holed plate, bolts, post and hole, etc., physical connectors). The tensioning spring 212 is connected to the filter element separating support 210 through a similar (but not necessarily identical) physical connector 214 (here shown as a hook and hole bolted connector). One of the tracks or troughs in the filter element separating support 210 is shown with the tape 208 deformed by insertion of one of the four extending linear edges inserted into each of the length of the two opposed filter element separating support arms (here because of edge view of the length of the two opposed filter element separating support arms, only the end view of the filter element separating support 210 is seen). Element 220 is the raised separation plate between troughs in the filter element separating support 210 with a filter element separation arm 219 to the physical connector hook and loop 214. A linear edge 206 is shown inserted into the tape 208.

Figure 3:
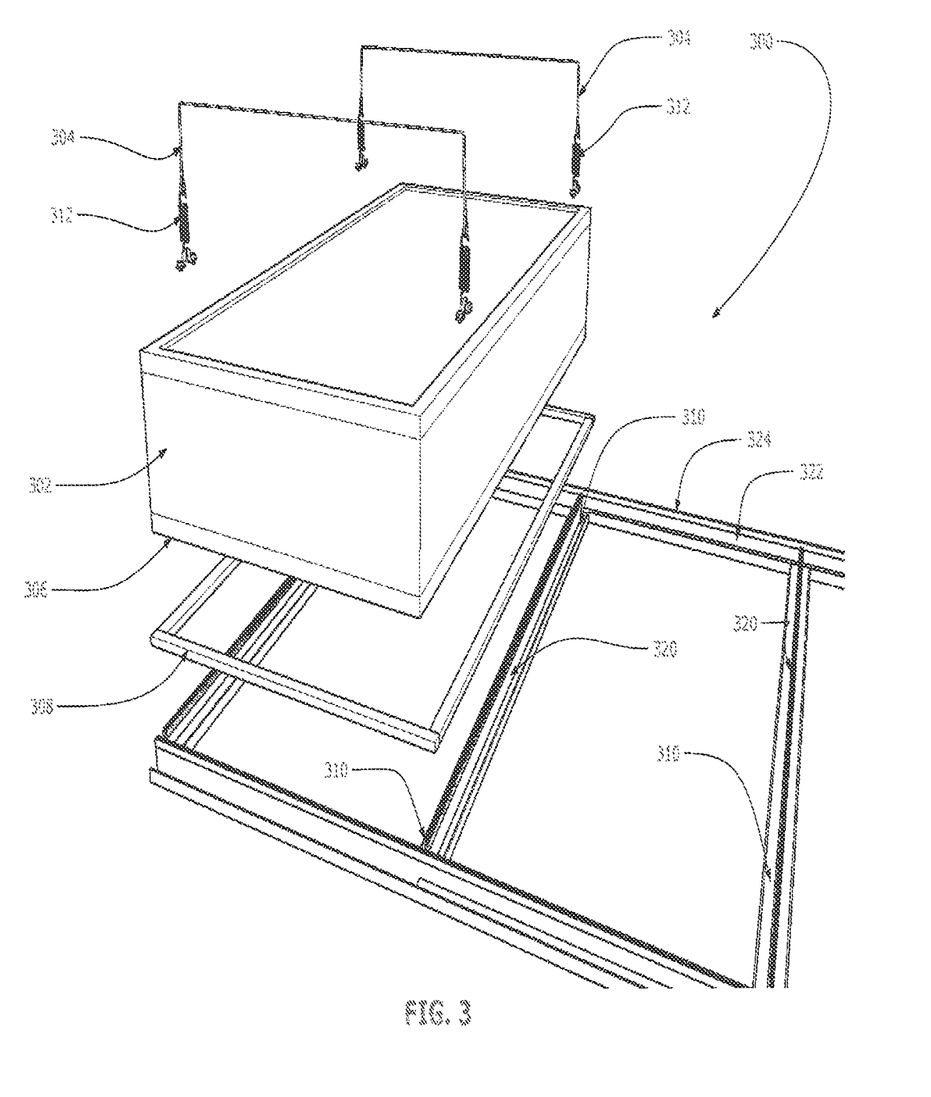
FIG. 3 is a perspective exploded view of tensioning cable supports, a filter element, four joined ULDP tape strips and a frame configured to support and connect two separate filter elements.

FIG. 3 is a perspective exploded view 300 of tensioning cable supports 304 with tensioning springs 312, a filter element 302, four joined ULDP tape strips 308 and a frame 324 configured to support and connect two separate filter elements 302 (only one shown). The frame 324 also has troughs 310 separated by the raised separation plate 320. The tape 308 is seated onto the troughs 310 and 322 and the four extending linear edges are inserted into each of the length of the two opposed filter element separating support arms and the troughs 322 on the orthogonal support arms.

Figure 4:
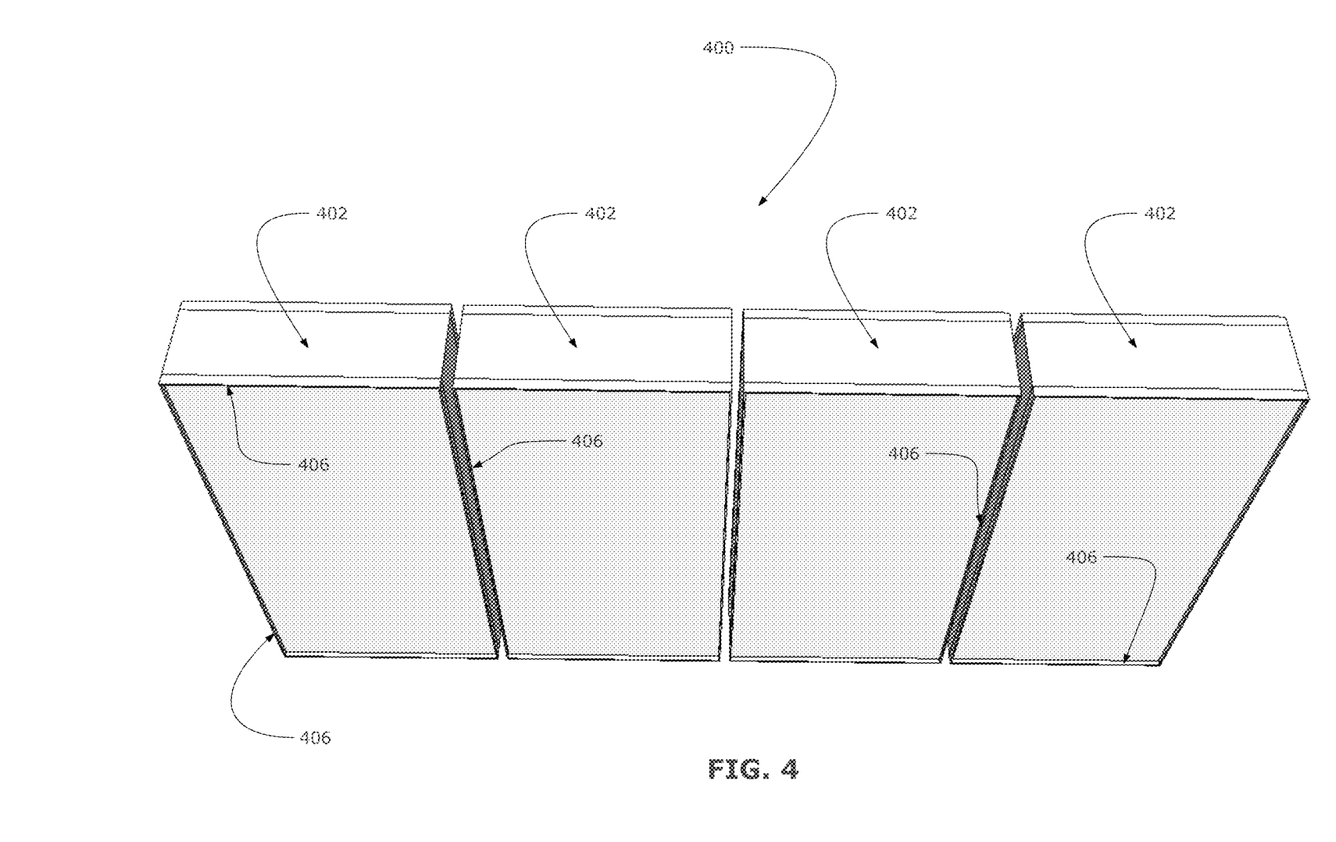
FIG. 4 is a perspective view of four unassembled filter elements

FIG. 4 is a perspective view 400 of four unassembled filter elements 402. The four extending linear edges 406 are shown on each of the filter elements 402.

Figure 5:
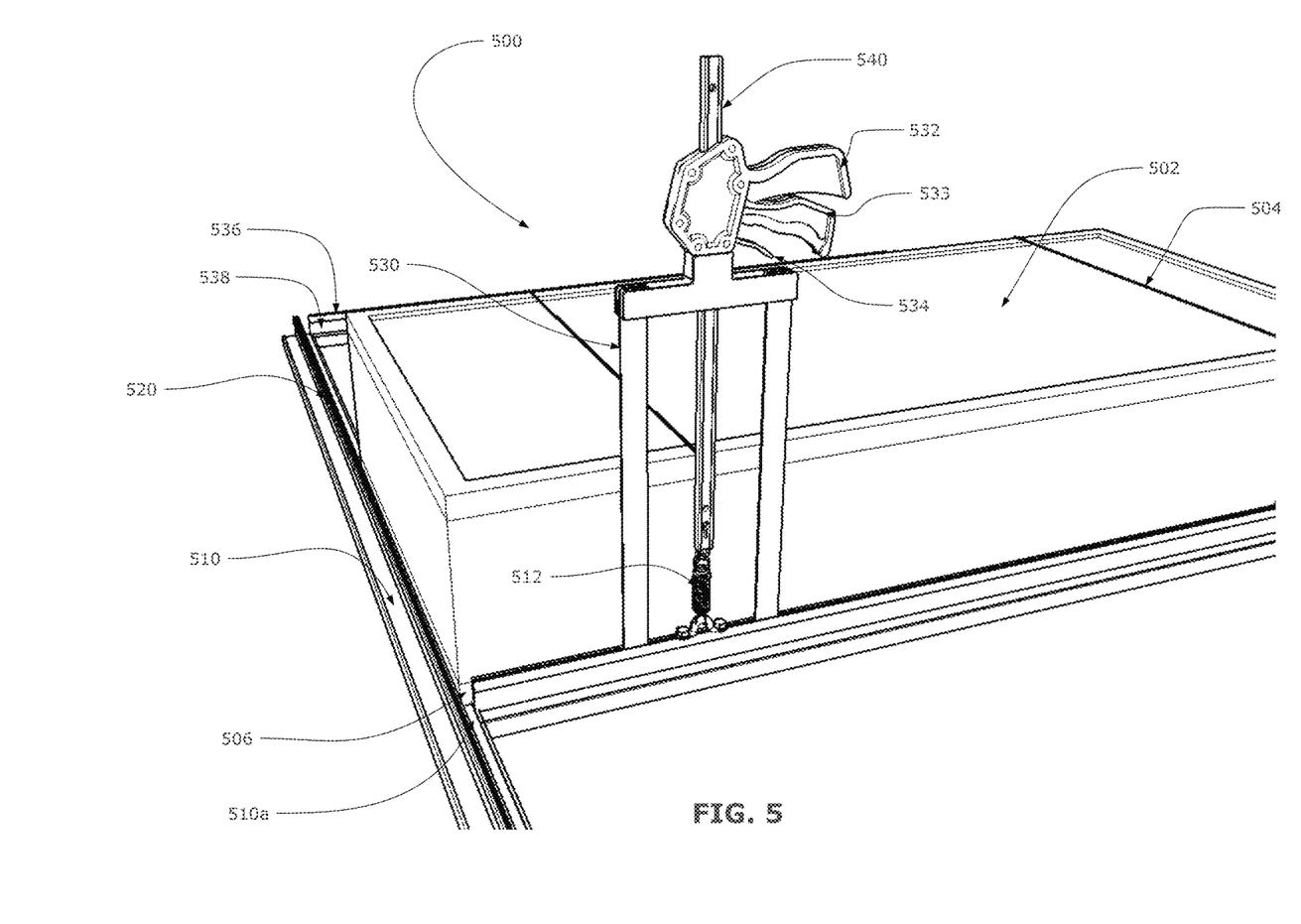
FIG. 5 is a perspective partial view of a ratcheting lifting system and/or cable attaching system for filter elements on frames.

FIG. 5 is a perspective partial view 500 of a ratcheting lifting system and/or cable attaching system for filter elements 502 on frames 536. The ratcheting system and other elements are addressed by the following key:
500 Filter under load and load transfer device
502 Filter body
504—Load transfer cable
506—Low Density Sealant
510—Gel Track with Low Density Sealant
510a—Gel Track with Low Density Sealant
512—Load Spring
520—¼" 20-Treaded track for installation of Saddle FIG. 2 (214)
530—Load installation stabilizer
532—Load Tensioner Handle grip
533—Load Tensioner ratcheting grip
540—Load Tensioning rod
534—Load Tensioning transfer release trigger.

The repeated squeezing of the load tensioner Handle grip 532 and the load tensioner ratcheting grip 533 ratchets the load installation stabilizer along the load tensioning rod. Although the troughs or tracks 510 and 510a are referred to as "gel tracks," this is merely previously existing structure into which the ULDP tapes are placed in the practice of the present invention.

As previously noted, other sealants may less preferably be used in the end support arm troughs or tracks 538 and the short side tracks or troughs 510a. If filter elements are put into an end-to-end (rather than or in addition to side-by-side) orientation, ULDP tape may be placed into tracks 510, 510a and 538.

The unique finding that ULDP tape may be used as the sealant is not only surprising, but the level of benefit and performance of the ULDP tape is unexpected.

Regular density (e.g., >7.0-1.50 specific gravity) materials are good sealants in other specialty areas, and even low-density polytetrafluoroethylene materials has limited use in other technical areas. For example, while chemical attack or extreme temperature might not leave any choice besides PTFE (these conditions are not present in medical clean rooms), there are some disadvantages to the material that could affect projects in other areas. Strong chemical disinfectants are prevalent in medical clean rooms. That product does not lend itself to temperatures above 600° F.

Higher Hardness

Virgin PTFE's hardness is 55 Shore D, which is much harder than a typical Nitrile O-Ring at 70 Shore A, which is a softer scale. The higher hardness negatively affects sealability, as the material doesn't conform the mating hardware surfaces as easily.

Leakage Rate

While rubber O-Rings might conform to "as machined" surfaces, standard PTFE sealants may require post-process surface finish improvements to control leakage to acceptable levels. This cannot be easily performed on the filter elements and frames discussed herein In general, under normal conditions, the leakage rate for a standard specific gravity and normal density PTFE O-Ring will be higher than any elastomeric compound, especially those used as sealants. These normal and generally better chemical classes of sealants include polyurethanes, polysiloxanes (and other silicone polymers), polyacrylates, synthetic rubbers and synthetic elastomers (e.g., typically ethylenically unsaturated monomer polymers such as isoprene, polybutadiene, acrylonitrile, styrene and the like).

The use of a PTFE O-Ring is therefore not generally recommended for applications that don't require extreme temperature or severe chemical conditions, which clean rooms do not.

Inelasticity

PTFE's nature as an inelastic material means that reuse or multiple installations of the same seal will not be possible. Unlike rubber compounds, PTFE will not return to its original shape and cross-section once deformed during installation and use. That means PTFE O-Rings or tapes or beads are typically only recommended for static face seal or flange type configurations that are not actively engaged and disengaged. This is in contrast to the replaceable connections for filters on clean room air flow systems which must be changed regularly and tend to be used in rapid assembly and rapid disassembly situations.

For example, a PTFE O-Ring or bead would not be recommended for a chamber door seal that needs to be opened and closed frequently, as the O-Ring would likely have to be replaced after every use.

A reused PTFE O-Ring or bead may look and perform similarly to a standard rubber O-Ring suffering from extreme compression set. But unlike rubber, this compression set occurs after only one use.

More often, PTFE O-Rings are found in flange gasket type applications where the seal will remain static and undisturbed until the next service interval.

It is surprising that the narrow class of ULDP tapes have been found to be useful in the attachments of filter elements to frames in clean room environments because of some of these properties that were considered deficiencies in other environments. For example, the fact that ULDP tapes permanently deform is acceptable in the clean room filter setting, as the filters are not frequently opened and closed or placed and removed, and when they are removed, they are always replaced. The non-adherent properties of ULDP tapes would be expected to reduce sealing quality, but because the tape readily deforms yet retains its structural integrity, the tape forms a good seal on the first insertion of the linear edge (e.g., 306 in FIG. 3.

The non-adherence also allows for physical stripping or manual peeling of the tape when disassembly of the clean room or removal of the filter takes place. Minimal or no special cleaning (degreasing, scrubbing of decomposed polymer, sludge removal, solvent washes and the like) is seldom needed. No more than standard sanitation wiping (using 90% by weight or above of isopropyl alcohol) is typically necessary when changing filters.

ULDP tapes are commercially available from Three Square Solutions, Inc. as "UltraLDS™ ULDP tape. The dimensions of the tape should be at least 0.5 inches by 0.5 inches (1.25 cm×1.25 cm) in diameter, with the length selected according to dimensions of the filters and frames. Preferably the dimensions should be 1 inch by 1 inch (2.5×1.5 cm), 1.5×1.5 inches (3.8×3.8 cm), and variations of all dimensions between 0.5 inches (1.25 cm) and 6 inches (15.3 cm) useful. Tapes are also available from Technetics Group, a subsidiary of Enpro Industries Inc.

A Nov. 29, 2012 Bulletin (submitted with this Patent Document to the USPTO, and as with all documents cited herein, is incorporated in its entirety by reference) from Camfil™ clean air solutions discusses the complexity, difficulties and benefits of gel sealants (as are today used in attaching HEPA (high efficiency particulate arresters or air filters) in commercial environments, specifically discussing knife edge insertion into troughs containing gel (with both silicone and polyurethane gels discussed). Problems include oozing or spreading of the gels beyond desired limits in the devices or even outside the devices. The need for intensive cleaning of areas where the gel has been used, if those areas are to be used again, and the like.

The unique properties of ULDP tapes and their first time use in the field of the present invention sealing knife-edge connections between HEPA filters and gas-tight clean room and especially medical clean room environments has provided a long-sought need in the field. The ULDP tapes have been defined as PTFE (polytetrafluoroethylene) tapes, but copolymers of PTFE may also be used as long as the resulting polymer retains off-gassing and preferably non-stick, cohesive and chemically resistant, as is monomeric PTFE polymer.

In reviewing the graphic representations of tests for off-gassing, the following explanation of those figures will be helpful. The basis for both outgassing tests are the Intel protocols of 50 C for 30 min. As noted in the Outgassing Analysis Notes, the following are the same:

1) Retention time is +/−0.2 min
2) n-decane was used as a standard for both tests. The test detection limit is 0.1 ppmw (parts per million by weight) for both tests.
3) The amount of total outgassing includes all peaks detected.

The chromatograph, FIG. 2 on both reports, is a two dimensional x, y, graph. The horizontal x axis is the time at which a substance was detected, and a peak generated. The specific time a peak occurs identifies the substance. The vertical y axis, or area under the peak, is indicative of the amount of a specific substance present. On the graphs this referred to as abundance.

The SolidSeal™ gel chromatogram (page 5, FIG. 2) shows peaks so small they cannot be identified. The Total Outgassing Compounds (page 6, table 1) is 0.1 ppmw (parts per million by weight).

The WM Plastics product off-gasses a number of unfavorable compounds (table 1) 2200 times that of Solidseal™ gel. It becomes readily apparent when comparing the two reports that Solidseal™ gel is the superior product.

One aspect of the benefits of the present invention is clearly displayed in graphs comparing commercial materials and the materials used in the practice of the present invention.

Figure 6A:
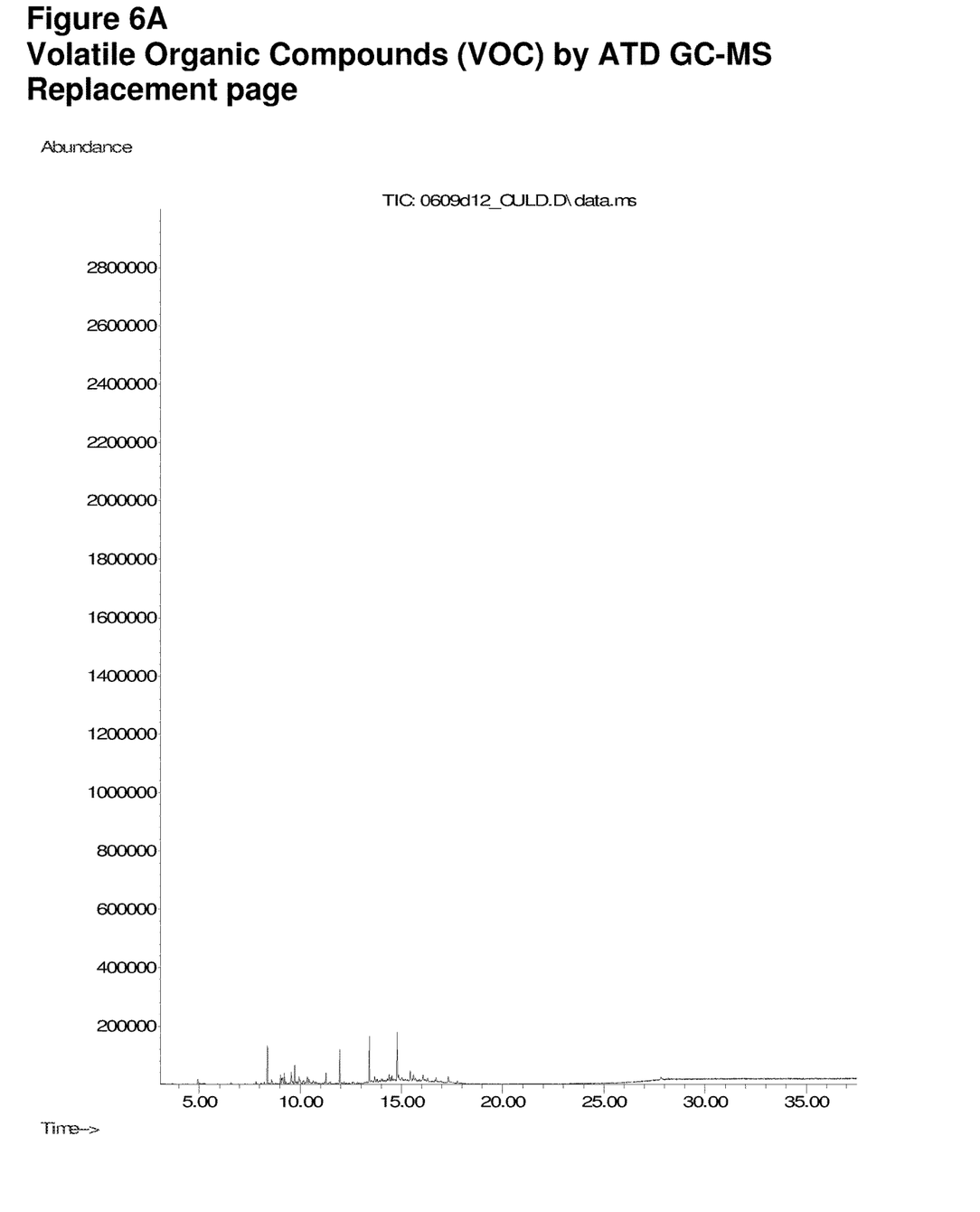
FIG. 6A is a chromatogram of a control run with no off-gassing materials present, showing progressive emission results for 35 minutes.

FIG. 6A is a chromatogram of a control run with no off-gassing materials present, showing progressive emission results for 35 minutes. There are zero recorded abundancies (off-gassed materials measured in units of parts per million by weight). There is a system meaningless display of less than 200,000 ppmw at 26+ minutes.

Figure 6B:
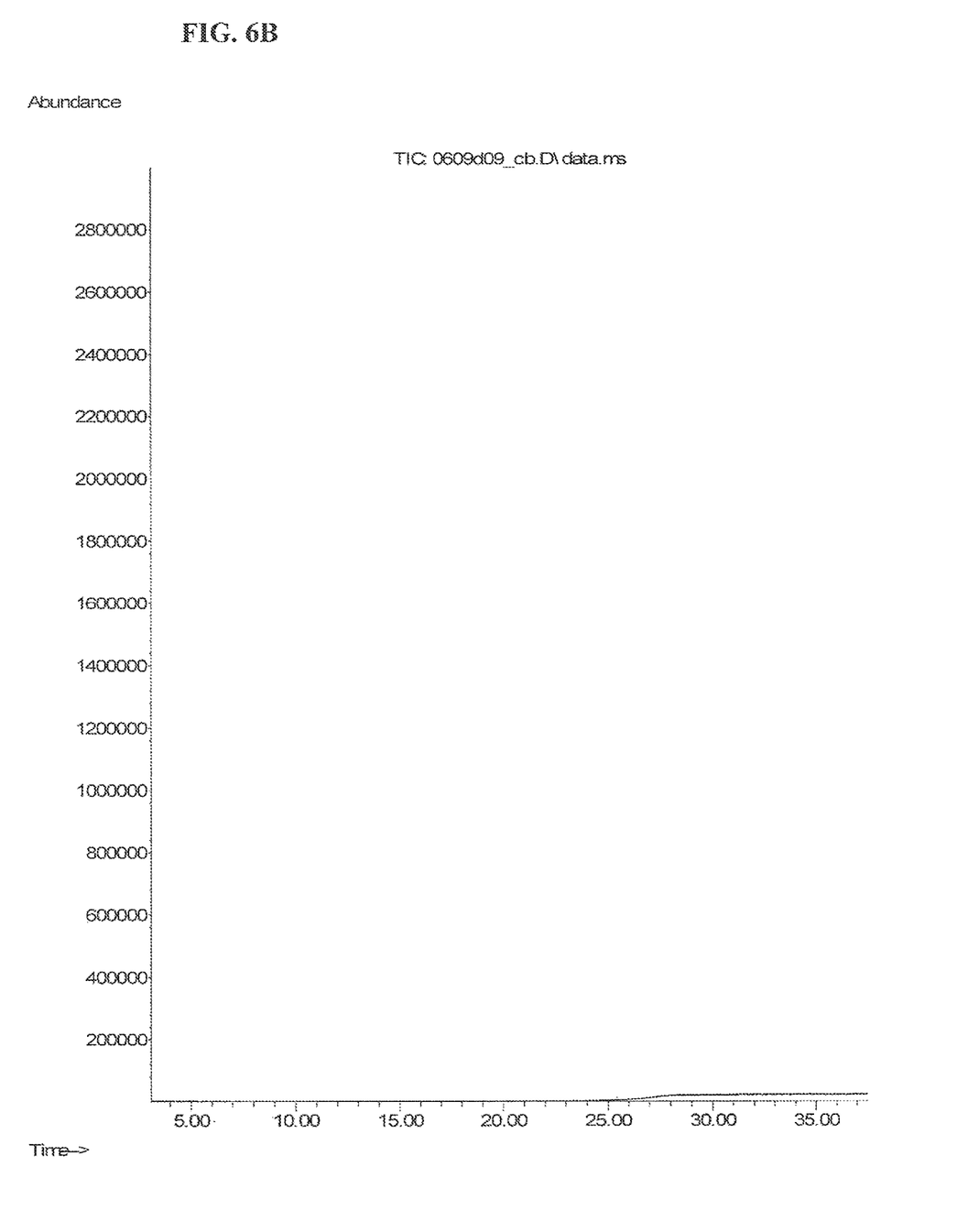
FIG. 6B is a chromatogram of a run on materials used in the practice of the present invention with modest off-gassing materials present, showing progressive emission results for 35 minutes.

FIG. 6B is a chromatogram of a run on materials used in the practice of the present invention with modest off-gassing materials present, showing progressive emission results for 35 minutes. As can be seen, there are three sharp (single compound) peaks with abundancies between 400,000 and 800,000 ppmw. There are three other sharp peaks at about 200,000. Peaks (single compounds off-gassed) at 200,000 and less are considered insignificant. The system meaningless display is still present at less than 200,000 ppmw at 26+ minutes.

Figure 6C:
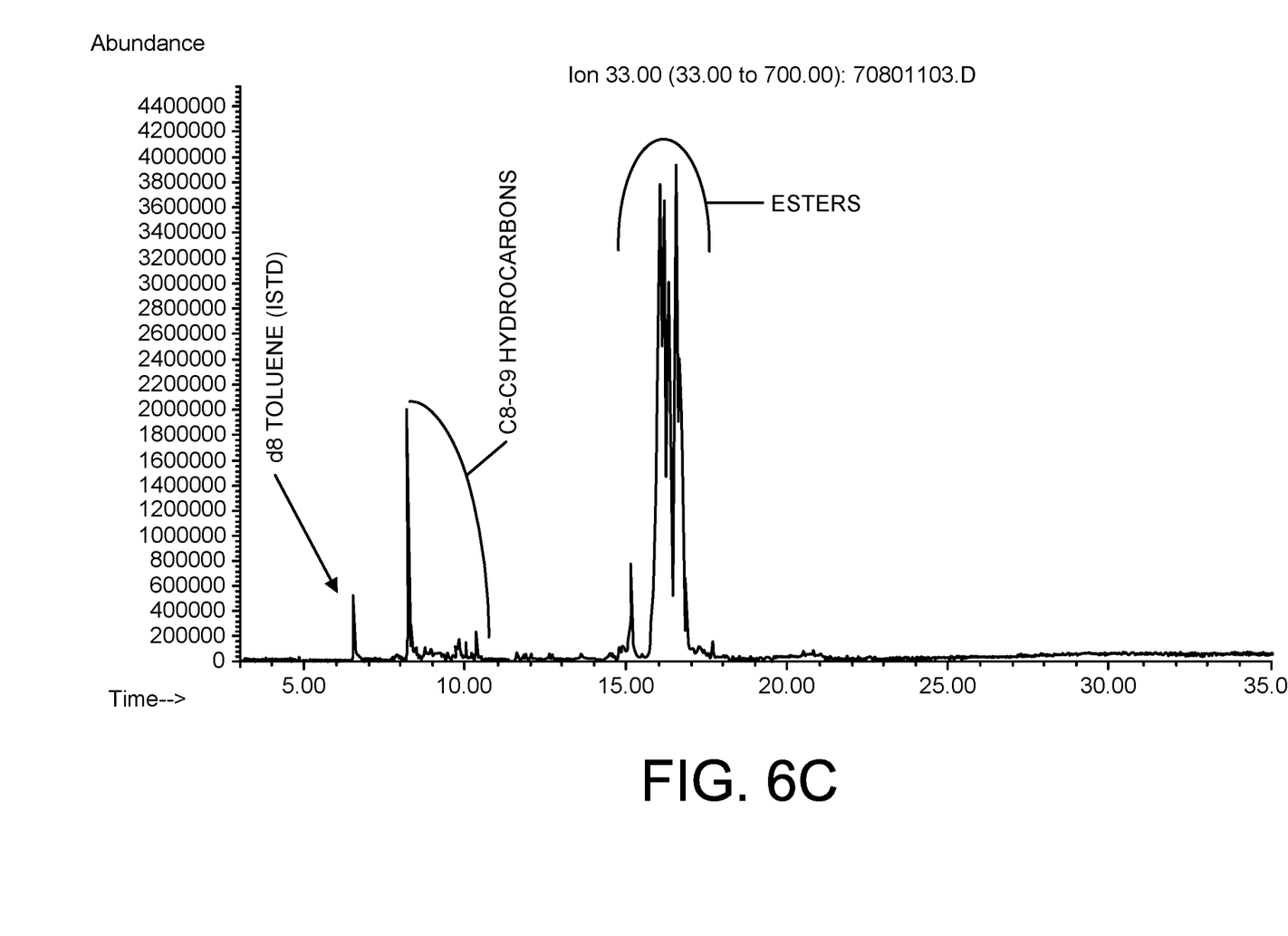
FIG. 6C is a chromatogram of a run on SoftSeal™ urethane gels materials used commercially in the field of practice of the present invention with extremely high off-gassing materials present, showing progressive emission results for 35 minutes.

FIG. 6C is a chromatogram of a run on SoftSeal™ urethane gels materials used commercially in the field of practice of the present invention with extremely high off-gassing materials present, showing progressive emission results for 35 minutes. There are six broader peaks (extended released materials) with abundances over 2,000,000. Not only are there more peaks, but the amount of materials evidenced at each peak are multiples of those shown by low-density ePTFE materials shown in FIG. 6B. The system meaningless display is still present at less than 200,000 ppmw at 26+ minutes.

Figure 6D:
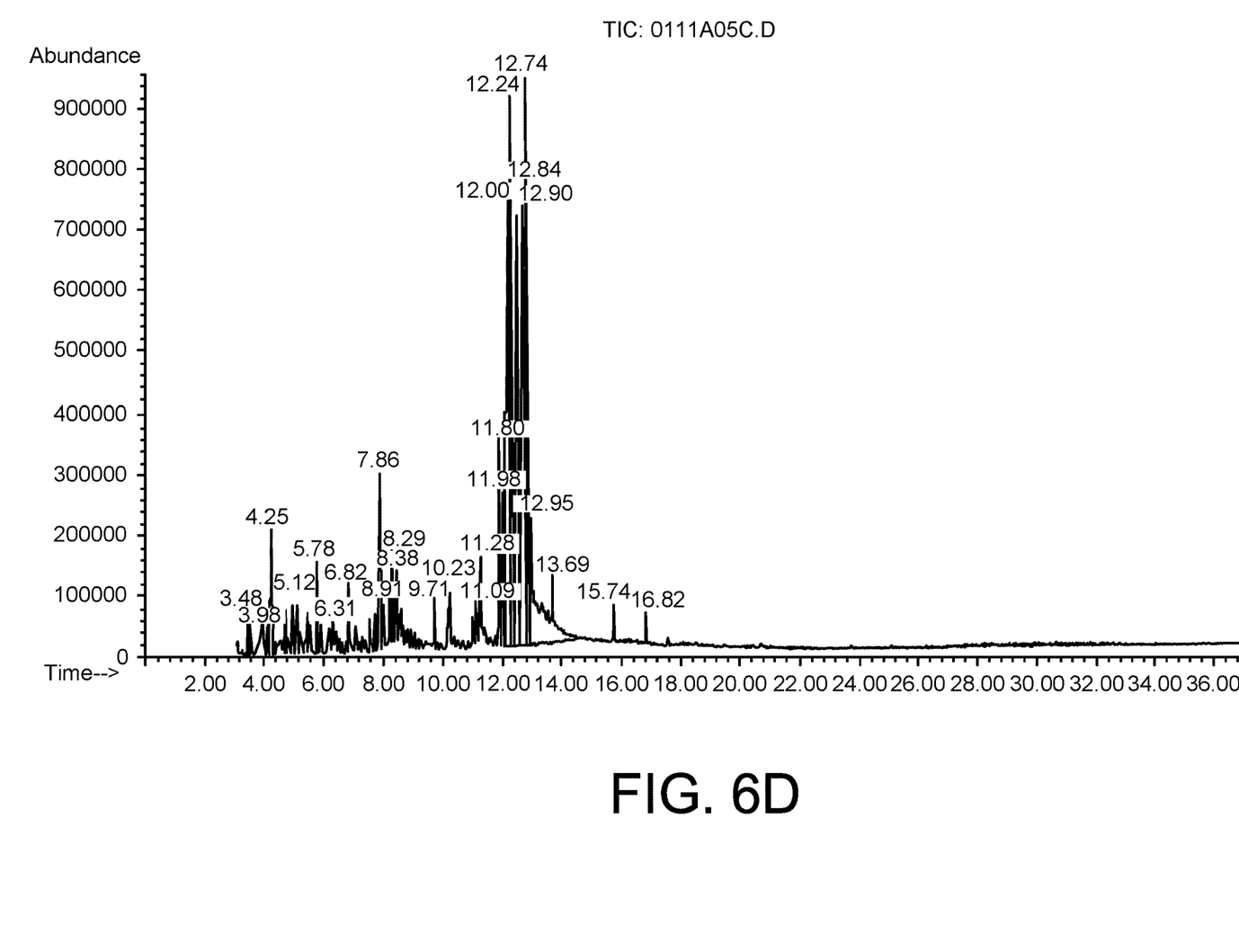
FIG. 6D is a chromatogram of a run on Easy Pour™ urethane gels materials used commercially in the field of practice of the present invention with both high off-gassing materials and large numbers of off-gassed materials present, showing progressive emission results for 35 minutes.

FIG. 6D is a chromatogram of a run on Easy Pour™ urethane gels materials used commercially in the field of practice of the present invention with both high off-gassing materials and large numbers of off-gassed materials present, showing progressive emission results for 35 minutes. This graph must be cautiously evaluated with respect to the information in FIG. 6B because of the different scales used for the abundances. Not only does the Easy Pour™ gel have two sharp peaks over 900,000 ppmw, but there are also about four additional peaks over 700,000 and at least three peaks over 300,000. The system meaningless display is still present at less than 200,000 ppmw at 26+ minutes.

The present invention therefore enables provision of a low off-gassing composition with five or fewer abundance peaks between 300,000 and 800,000, and even four or fewer (exactly three) abundance peaks between 300,000 and 800,000 within 20 minutes at 50° C. The system meaningless display is still present at less than 200,000 ppmw at 26+ minutes, and even exactly three abundance peaks between 300,000 and 800,000 within 20 minutes at 50° C.

What is claimed:

1. A method for applying multiple filter elements into an air flow surface of a medically safe room and limiting air flow around sides of the filter elements comprising:
providing a frame that supports at least two adjacent filter elements having two pairs of opposed sides, one pair of opposed sides along its length and a second pair of opposed sides along its width;
the frame having at least one filter element separating support arm aligned to support adjacent filter elements;
the at least one filter element separating support arm separated by an orthogonal bracing arm;
the frame is formed with each filter element separating support arm being positioned and spaced between two adjacent filter elements, each filter element separating support arm being spaced and between two adjacent filter elements, each filter element separating support arm having two parallel tracks separated by a raised panel extending the length of the two parallel tracks, and two parallel outside support arms are positioned at outer edges of the multiple filter elements, the two parallel outside support arms having at least one track with raised sides forming the at least one track;
each orthogonal bracing arm having at least one track with raised sides along a length of each at least one track;
the filter elements having four linear edges extending coplanar from sides of the filter elements along a bottom of each of the opposed sides of the filter elements with a width less than a width of a parallel track;
placing a tape of elastic ultralow density polytetrafluoroethylene polymer having a specific gravity of greater than 0.25 and less than 0.6 along the width of the two parallel tracks in at least one opposed filter element separating support arm;
placing a tape of elastic ultralow density polytetrafluoroethylene polymer having a specific gravity of greater than 0.25 and less than 0.6 along the length of the two parallel tracks in at least one opposed filter element separating support arm;
placing the non-off gassing sealant tape along the at least one track in the two outside support arms and along the length of the at least one track in each bracing arm;
inserting the four extending linear edges into each of the length of the two opposed filter element separating support arms and along the length of the at least one track in each bracing arm;
the four extending linear edges compressing and conforming the tape in the two parallel tracks in at least one opposed filter element separating support arm to form an effectively air tight seal along every track; and
placing an elastically restraining cable on a face of each of the filter elements opposite to two of the four extending linear edges;
wherein at least one filter element is supported by a load spring attached to a load tensioning rod, with the load tensioning rod having a ratchet with handle grip to ratchet the load tensioning rod.

2. A method for applying multiple filter elements into an air flow surface of a medically safe room and limiting air flow around sides of the filter elements comprising:
providing a frame that supports at least two adjacent filter elements having two pairs of opposed sides, one pair of opposed sides along its length and a second pair of opposed sides along its width;
the frame having at least one filter element separating support arm aligned parallel to the one pair of opposed sides along the length of the adjacent filters to support adjacent filter elements;

the filter element separating support arms separated by orthogonal bracing arms;

each filter element separating support arm is positioned and spaced between two adjacent filter elements having two parallel tracks separated by a raised panel extending the length of the two parallel tracks, and two outside support arms having at least one track with raised sides parallel to the one pair of opposed sides along the length of the adjacent filters to support adjacent filter elements;

each orthogonal bracing arm having at least one track with raised sides along a length of each at least one track;

the filter elements having four extending linear edges along a bottom of each of the opposed sides of the filter elements with a width less than a width of a respective track on the filter element separating support arms and the orthogonal bracing arms;

placing a tape of elastic ultralow density polytetrafluoroethylene polymer having a specific gravity of greater than 0.25 and less than 0.6 along the length of two tracks in at least one opposed filter element separating support arm;

placing the sealant tape along the at least one track in the two outside support arms and along the length of the at least one track in each bracing arm;

inserting the four extending linear edges into each of the length of the two opposed filter element separating support arms, into the two outside support arms having at least one track, and along the length of the at least one track in each bracing arm;

the four extending linear edges compressing and conforming the tape to form an effectively air tight seal along every track; and placing an elastically restraining cable on a face of each of the filter elements opposite to two of the four extending linear edges;

wherein at least one of the four extending linear edges of the at least one filter element is supported by a load spring attached to a load tensioning rod, with the load tensioning rod having a ratchet with handle grip to ratchet the load tensioning rod.

3. The method of claim 2 wherein the elastic ultralow density polytetrafluoroethylene polymer having a specific gravity of greater than 0.30 and less than 0.55.

4. The method of claim 3 wherein restraining cables are attached at opposite ends to tension springs secured in turn to a stable support element of the frame.

5. The method of claim 4 wherein the tape is between 0.5 and 6 inches in thickness prior to compression.

6. The method of claim 2 wherein restraining cables are attached at opposite ends to tension springs secured in turn to a stable support element of the frame.

7. The method of claim 6 wherein a previous set of filter elements is first removed from the frame by lifting used filters off the frame, physically peeling exhausted elastic ultralow density polytetrafluoroethylene polymer out of all tracks, replacing exhausted tape with elastic ultralow density polytetrafluoroethylene polymer tape, and then applying unused filters onto the frame and placing an elastically restraining cable on a face of each of the filter elements opposite to the four extending linear edges.

8. The method of claim 6 wherein a previous set of filter elements is first removed from the frame by lifting used filters off the frame, physically peeling exhausted elastic ultralow density polytetrafluoroethylene polymer out of all tracks, replacing exhausted tape with virgin elastic ultralow density polytetrafluoroethylene polymer tape, and then applying reused and cleaned filters onto the frame and placing an elastically restraining cable on a face of each of the filter elements opposite to the four extending linear edges.

9. The method of claim 2 wherein the tape is between 0.5 and 6 inches in thickness prior to compression.

10. The method of claim 2 wherein a previous set of filter elements is first removed from the frame by lifting used filters off the frame, physically peeling exhausted elastic ultralow density polytetrafluoroethylene polymer out of all tracks, replacing exhausted tape with elastic ultralow density polytetrafluoroethylene polymer tape, and then applying unused filters onto the frame and placing an elastically restraining cable on a face of each of the filter elements opposite to the four extending linear edges.

11. The method of claim 2, wherein all of the tape and the sealant tape in the frame comprises a tape of elastic ultralow density polytetrafluoroethylene polymer having a specific gravity of greater than 0.25 and less than 0.6.

12. The method of claim 11 wherein a chromatograph of emissions from the tape material displays four or fewer abundance peaks between 300,000 and 800,000 parts per million by weight within 20 minutes at 50° C.

13. A clean room with a replaceable filter element system comprising:

a frame that supports at least two adjacent filter elements having two pairs of opposed sides one pair along its length and a second pair along its width;

the frame having pairs of filter element separating support arms aligned to support adjacent filter elements;

the pairs of filter element separating support arms separated by orthogonal bracing arms;

each filter element separating support arm is positioned and spaced between two adjacent filter elements having two parallel tracks separated by a raised panel extending the length of the two parallel tracks, and two parallel outside support arms having at least one track with raised sides;

each orthogonal bracing arm having at least one track with raised sides along a length of each at least one track;

the filter elements having four extending linear edges along a bottom of each of the opposed sides of the filter elements with a width less than a width of a parallel track;

a tape of elastic ultralow density polytetrafluoroethylene polymer having a specific gravity of greater than 0.25 and less than 0.6 positioned along the length of the two tracks in at least one opposed filter element separating support arm, along the at least one track in the two outside support arms and along the length of the at least one track in each bracing arm;

the four extending linear edges inserted into each of the length of the two opposed filter element separating support arms and along the length of the at least one track in each bracing arm;

the four extending linear edges having compressed and conformed the tape within the length of the two tracks in at least one opposed filter element separating support arm, along the at least one track in the two outside support arms and along the length of the at least one track in each bracing arm to form an effectively air tight seal along every track; and an elastically restraining cable on a face of each of the filter elements opposite to two of the four extending linear edges; and wherein at least one filter element is supported by a load spring attached to a load tensioning rod, with the load tensioning rod having a ratchet with handle grip to ratchet the load tensioning rod.

14. The clean room of claim 13 wherein the elastic ultralow density polytetrafluoroethylene polymer has a specific gravity of greater than 0.30 and less than 0.55.

15. The clean room of claim 13 wherein restraining cables are attached at opposite ends to tension springs secured in turn to a stable support element of the frame.

16. The clean room of claim 13 wherein a chromatograph of emissions from the tape material displays four or fewer abundance peaks between 300,000 and 800,000 parts per million by weight within 20 minutes at 50° C.

17. The clean room of claim 16 wherein the elastic ultralow density polytetrafluoroethylene polymer has a specific gravity of greater than 0.30 and less than 0.55.

* * * * *